Figure 1:
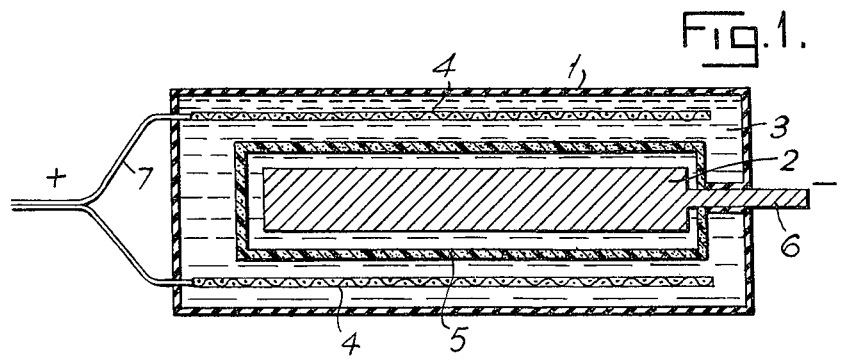

United States Patent

Tseung et al.

[11] 3,897,267
[45] July 29, 1975

[54] ELECTROCHEMICAL CELLS

[75] Inventors: Alfred Chan Chung Tseung; Beatrice Yuck Chaan Wan; Walter John King, all of London, England

[73] Assignee: National Research Development Corporation, London, England

[22] Filed: Oct. 19, 1970

[21] Appl. No.: 81,933

[30] Foreign Application Priority Data
Oct. 20, 1969 United Kingdom............... 51401/69

[52] U.S. Cl.............................................. 136/86 A
[51] Int. Cl. .......................................... H01m 27/00
[58] Field of Search................................... 136/86 A

[56] References Cited
UNITED STATES PATENTS

| | | | |
|---|---|---|---|
| 3,214,296 | 10/1965 | Smatko............................ | 136/86 A |
| 3,223,556 | 12/1965 | Cohn et al. ....................... | 136/86 R |
| 3,355,328 | 11/1967 | Meyers et al. ................... | 136/100 R |
| 3,438,241 | 4/1969 | McKinley............................. | 73/23 |
| 3,457,115 | 7/1969 | Kent ................................. | 136/86 A |
| 3,518,123 | 6/1970 | Kalsoulis et al................... | 136/86 A |
| 3,531,327 | 9/1970 | Moos ................................ | 136/86 A |

*Primary Examiner*—John H. Mack
*Assistant Examiner*—H. A. Feeley
*Attorney, Agent, or Firm*—Kemon, Palmer & Estabrook

[57] ABSTRACT

A galvanic cell is described which is capable of implantation in living tissue. The cell is essentially a metal/oxygen cell and is covered with or encapsulated in a layer of material in the form of an oxygen permeable membrane, the anode and cathode components being separated by a barrier which is relatively impermeable to oxygen and not permeable to larger molecules, such as oxides of the metal, while allowing hydroxyl ions to diffuse through it.

8 Claims, 5 Drawing Figures

ELECTROCHEMICAL CELLS

This invention concerns implantable electric cells for use in human or other living bodies to power cardiac pacemakers, radio pills, etc., or to stimulate muscle contraction and nerve activity.

The possibility of using bio-galvanic electricity as in vivo energy has already been considered by some investigators. For example, it has been shown by Massie et al ("Study of power generating implantable electrodes", Medical and Biological Engineering, Volume 6, pages 503 to 516) that sufficient power for driving a cardiac pacemaker can be obtained from a pair of dissimilar electrodes, platinum black/aluminum, implanted subcutaneously with the body fluids serving as electrolyte, the aluminum undergoing dissolution. In this case, the following reactions take place:

Anodic reaction:
$$2Al + 6OH^- = 2AL(OH_3 + 6e = Al_2O_3 + 3H_2O + 6e$$
Cathodic reaction:
$$6E + 3H_2O + 1\tfrac{1}{2}O_2 = 6OH^-$$
Overall reaction:
$$2Al + 1\tfrac{1}{2}O_2 = Al_2O_3$$

The oxygen required for the cathodic reaction is obtained from the dissolved oxygen in the body fluids, thus enabling the total weight of such a system to be reduced to a level much lower than that of conventional mercury cells. Moreover, the life of such a bio-galvanic cell would be potentially longer than that of a comparable mercury cell since the oxygen supply for the former is not limited as it is for the latter.

However, there are several disadvantages to the bio-galvanic cell concept just discussed, namely:

1. A bio-galvanic cell is basically a metal/oxygen cell in which the metal anode material is consumed continuously and the corrosion products (hydroxides, oxides, etc.,) from the anode could spread to other parts of the host body and cause harmful effects. Also, these products may cover the surface of the cathode, leading to higher cathode polarisation.
2. A metal anode placed in body fluid would tend to undergo self-discharge in the presence of dissolved oxygen. Thus, cathodic and anodic sites will be formed on the surface of the anode, leading to lower efficiency.
3. Serious metal-tissue reactions may occur at the electrode/tissue interfaces, leading to the deposition of necrotic debris on the electrode surface and eventual encapsulation of the electrodes by fibrous tissue, with resultant decrease in cell performance.
4. Since the body fluids serve as electrolyte, this would be common to adjacent cells and it is not possible to connect cells in series to obtain higher voltages.

An object of the present invention is to reduce such disadvantages, and, to this end, there is provided a galvanic, metal/oxygen cell which is covered with or encapsulated in a layer of oxygen permeable material, and within which the anode and cathode components are separated by a barrier which is relatively impermeable to oxygen and not permeable to larger molecules, such as oxides of the metal, while allowing hydroxyl ions to diffuse through it.

It will be apparent that the proposed cell will not use body fluids as electrolyte medium, but will have a self-contained medium for this purpose, with sodium chloride solution being preferred and more particularly a 0.9 (weight) % sodium chloride solution.

In order to further clarify the present invention, the same will now be described with reference to the accompanying drawings, in which:

FIG. 1 schematically illustrates one form of cell according to the invention, and FIGS. 2, 3, 4 and 5 graphically illustrate test results obtained during development of the invention.

The cell of FIG. 1 is of generally flat and circular form, the illustration being diagrammatic and showing a section at right angles to the main surfaces of the electrodes. The circular disc form metal anode 2 is preferably of aluminum, although other metals such as magnesium alloy (alloyed with aluminum, say), zinc, lead and iron, may be used. By using very high purity metals, one is able to avoid the presence of a trace impurity which could form a local galvanic cell on the anode, thereby reducing efficiency. Aluminium of 99.999 per cent purity is available and sheet of 0.040 inch thickness was used for the test cell. An oxygen electrode (cathode) 4 is positioned on either side of the anode 2. These cathodes are conveniently of the so-called hydrophobic kind and consist of a mixture of catalyst powder, such as platinum black, palladium-gold black, high surface area silver or silver-carbon, with a binder, such as a dispersion of polytetrafluorethylene (P.T.F.E.) as available under the Registered Trade Mark "Teflon," spread and sintered on an electrically conductive, corrosion-resistant screen such as of platinum, gold or silver. In a more particular example, platinum black and palladium-gold black on platinum mesh components have been suitably produced by spreading a catalyst/P.T.F.E. mixture on a platinum mesh of 80 mesh size, at 10 mg. catalyst with 3 mg. P.T.F.E. for each square centimeter of mesh, and sintering at 300° for one hour in air.

The cathodes 4 are separated from the anode 2 by a barrier 5 of anionic ion exchange resin of 0.020 inch thickness (such as available from American Machinery and Foundry Co. Limited) and the cell is externally bounded by an enveloping oxygen permeable membrane 1 of $1 \times 10^{-6}$ inch thickness. The membrane is preferably made of silicone rubber which is noted for the property in question and obtainable from Midland Silicones Limited; it is also substantially inert to body tissues, etc. The membrane envelope is sealed in liquid tight manner at emergence of the lead 6 to the anode and of leads 7 to the cathodes. The electrolyte medium 3 is, as noted above, preferably 0.9% by weight sodium chloride solution, sodium chloride solution being preferred because it readily affords transport of hydroxyl ions; the particular strength is preferred because this is isotonic with human body fluids and will reduce the possibility of osmotic effects influencing cell performance. The barrier and the membrane were attached by means of medical grade 'Silastic' adhesive supplied by Dow Corning.

There are certain advantages to the more particular cell form above described, and these are as follows:

i. The cell may be implanted in human tissue since the membrane 1 affords protection against the deposition of poisioning materials and necrotic debris from the host body on the electrode surfaces. Since the membrane is inert to the host tissue, any tendency to fibrous encapsulation and blood clotting in connection with the cell will be minimised.

Moreover, possible harmful effects of the cell reaction products on the host body are obviated since these products are effectively sealed inside the membrane and, indeed, inside the barrier.

ii. Most of the oxygen diffusing through the outer membrane will normally be used up at the cathode structure, but the use of an anionic ion exchange barrier will drastically reduce any remaining oxygen diffusion towards the anode. This serves to lower the self-discharge rate significantly and thereby to prolong the operating life of the cell as well as increasing the efficiency of the cell.

iii. The inter-electrode barrier 5 prevents the anodic reaction products, $Al_2O_3$ and $Al(OH)_3$ in this instance, depositing on the cathode structure.

iv. The use of the dual cathode structure increases the cathode surface area. This is advantageous for an implantable metal/oxygen cell since the cathode polarises more than the anode owing to the relatively low oxygen partial pressure in the body fluids.

v. The use of a sealed component type of structure with self-contained electrolyte medium enables several cells to be connected in series for higher voltage generation such as may be more appropriate for powering implantable artificial devices.

vi. Such a cell should give a longer operating life than that of a comparable mercury cell of conventional form. For example, design calculations have shown that 3.65 g. of aluminium will give 20 microwatts for five years at 0.5 V continuously. This estimate is based on a pessimistic rate of self-discharge of aluminium in 100% oxygenated sodium chloride solution. (Massie et al. — reference given above — showed that for a 16 cm² aluminium anode, the loss of aluminium due to self-discharge in 100% saturated sodium chloride solution was 0.5 g. per year).

vii. The proposed cell form can, in addition, be lighter and more compact than conventional mercury cells, and the basic cost is lower.

The development of the present invention has involved experimental testing in vitro and in vivo, and it is useful to comment on these experiments and the results obtained.

The in vitro experiments were conducted first with a view to ensuring that an adequate supply of oxygen could diffuse through the outer membrane of the proposed cell to the cathode, and that the corrosion products of the anode would not leak through the inter-electrode barrier. A series of tests were carried out to determine the rate of diffusion of oxygen through various silicone rubber membranes. The membrane giving the best performance (from the Hammersmith Postgraduate Medical School) in fact allowed a limiting current of over 500μA/cm² to be obtained from a hydrophobic platinum black disc cathode of 5.5 cm² area when tested at room temperature in 0.9% sodium chloride solution. Further tests showed that the anionic ion exchange material can prevent passage of aluminium hydroxide and oxide while meeting the other requirements mentioned above. Also, after an encapsulated aluminium/oxygen cell as illustrated in FIG. 1 was tested in a beaker of 0.9% sodium chloride solution, no trace of aluminium could be found in the surrounding medium.

The performance of two aluminium/oxygen cells on 10K ohms load, only one cell being encapsulated, is illustrated by the following more particular examples:

I. A simple non-encapsulated system was set up in glass apparatus with a 1 cm² aluminium anode, a cathode of the same area with 10 mg/cm² platinum black on a platinum screen made as described above, from a 10:3 platinum black/P.T.F.E. paste, and an inter-electrode barrier of sintered glass. The electrolyte medium was 0.9% sodium chloride solution, open to atmosphere and maintained at 37°C. The power output of this cell on the constant load was steady at 84μA and 0.9 V for over 300 hours.

II. A test of 200 hours duration was carried out with an encapsulated cell as in FIG. 1 with a 5.5 cm² aluminium anode and twin cathodes of the form of Example I. After an initial settling down period, the output on constant load was steady at 90μA and 0.90 V.

In the in vivo experiments, the performances of various encapsulated cells of the form of FIG. 1 were tested when implanted in rats anaesthetised with "Nembutal". The cells were implanted subcutaneously in the ventral flank area and the continuous power output from the cells was recorded over periods from 3 to 20 hours.

Figure 2:
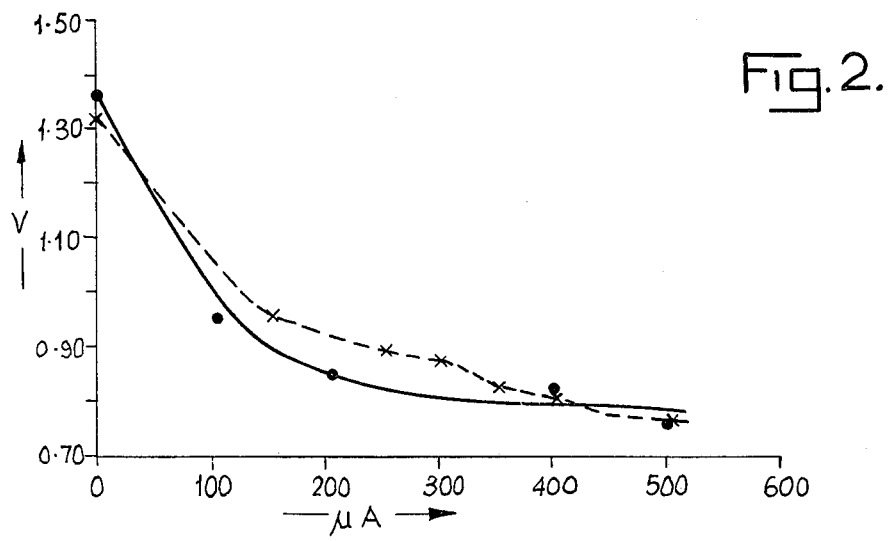
Figure 3:
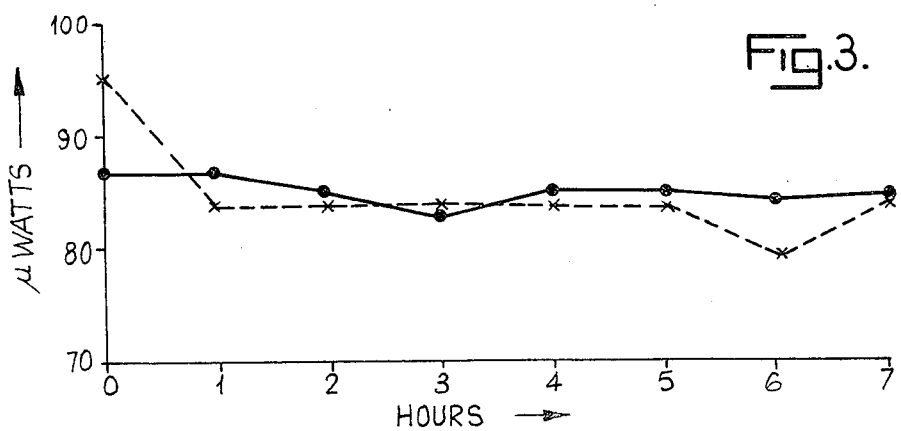
Figure 4:
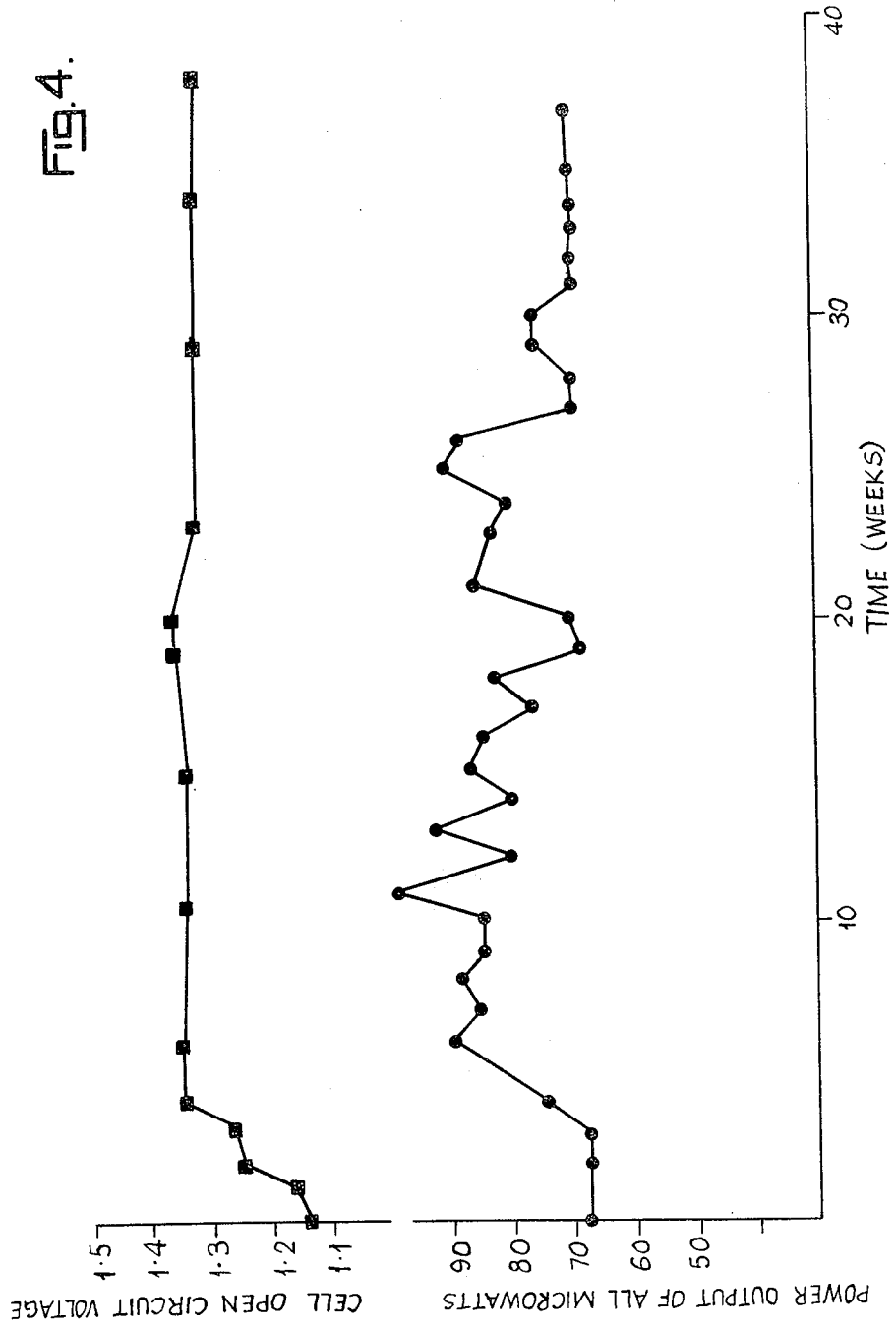

FIGS. 2 and 3 of the accompanying drawings illustrate some typical results obtained with these experiments. FIG. 2 shows the variation of output voltage in volts against current drawn from the cell in microamperes, and FIG. 3 shows the continuous power output in microwatts against time in hours. The solid line curves denote cells having cathode structures of palladium-gold black or platinum mesh, and the broken lines denote cells having cathode structures of platinum black on platinum mesh, there being twin 5.5 cm² cathodes made as described above in each case. The anodes were 5.5 cm² aluminium in each case.

It is clear from FIGS. 2 and 3 that a very steady level of power output can be obtained continuously. Also, it is to be noted that performance was not significantly affected by intermittent use.

Figure 5:
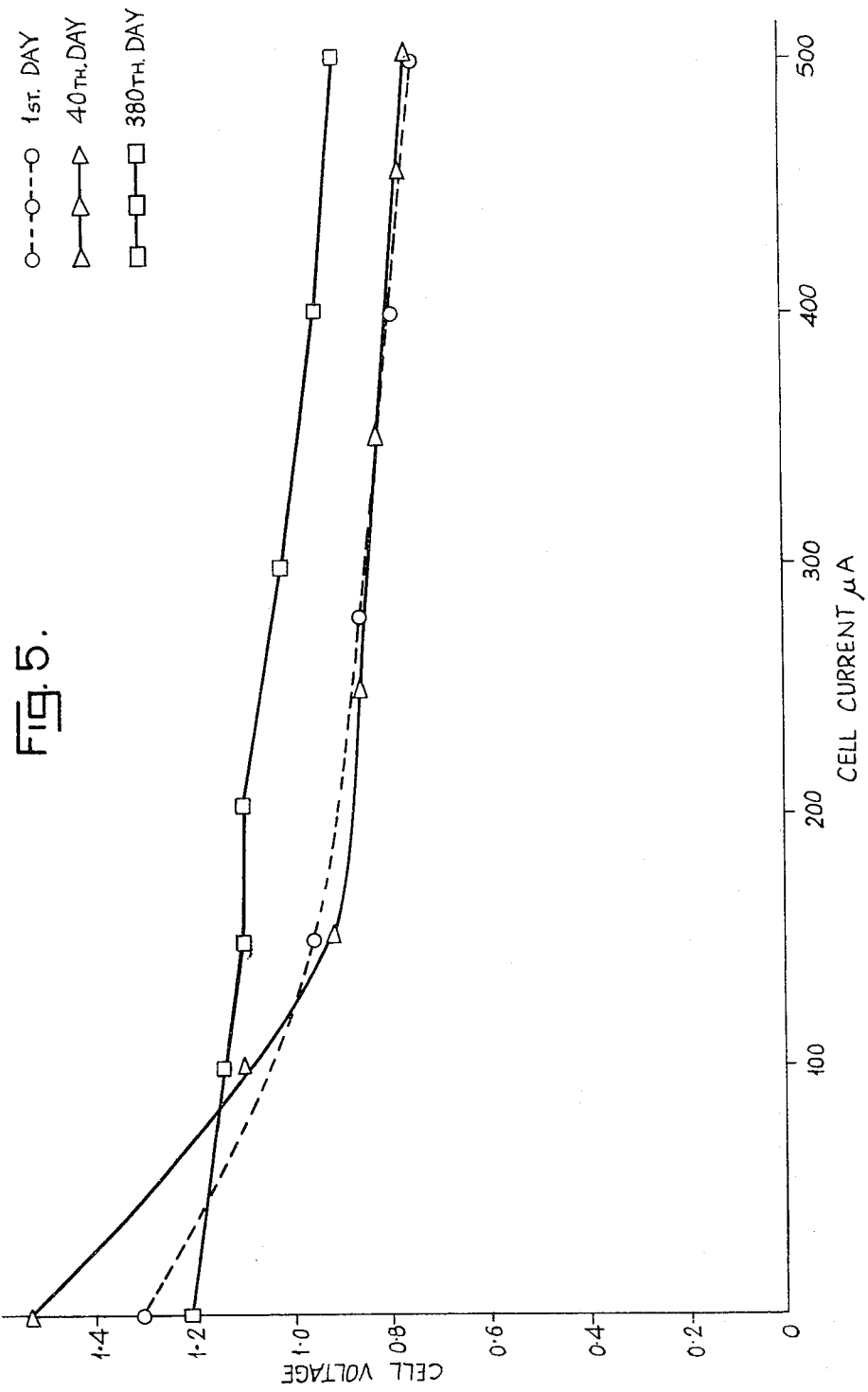

An in vitro test was carried out with an encapsulated cell as in FIG. 1 with a 5.5 cm² aluminium anode and twin cathodes of this same area and made in the same way as the cathode of Example I. The power output in microwatts derived from this cell under the 10K ohms load with the 0.9% sodium chloride solution electrolyte was measured at various times over a long period of over 40 weeks. The results are shown graphically in FIG. 4. Also shown in the Figure are the values of the open-circuit voltage of the cell at different times. This illustrates that the encapsulated cell is capable of maintaining reasonable power output over extended periods of time. In FIG. 5 are illustrated in vivo performances of an encapsulated cell in accordance with the invention when tested at different periods. These results show that the cell performance remained satisfactory over a period of at least 80 days. They also show that the performance was not affected by intermittent use. It has been noticed that there is no sign of clotting when such cells are removed from the animals' bodies.

Although stress has been laid on implantable cells, there is no reason why such cells need be implantable to be within the scope of the invention. A long-life cell may be provided which has applications in oxygen-containing atmospheres (such as atmospheric air).

Arrangements may of course be made to take account of the change of volume of the anode material when oxidised.

We claim:

1. A galvanic, metal/oxygen cell comprising anode and cathode components, barrier means between said components, said barrier means consisting of material which is relatively impermeable to oxygen and to larger molecules while permitting diffusion of hydroxyl ions therethrough, an electrolyte and a surrounding envelope of oxygen permeable material.

2. A galvanic cell as claimed in claim 1, wherein said barrier means is an anionic exchange resin.

3. A galvanic cell as claimed in claim 1, wherein said oxygen permeable material is a membrane of silicone rubber.

4. A galvanic cell as claimed in claim 1, wherein said electrolyte is isotonic with body fluids.

5. A galvanic cell as claimed in claim 4, wherein said electrolyte is an aqueous solution containing substantially 0.9 (weight) % sodium chloride.

6. A galvanic cell of the oxygen depolarised type comprising anode and cathode components of flat sheet form, a barrier of anion exchange resin substantially surrounding said anode component, an electrolyte in which said anode and cathode components are immersed, a liquid impermeable envelope composed of oxygen permeable material in the form of a membrane encapsulating said anode component, cathode component, barrier and electrolyte, and electrical leads from said anode component and said cathode component that pass through said envelope in fluid-tight manner.

7. A galvanic cell as claimed in claim 6 wherein said anode component is a disc of high purity metal, said cathode component comprises catalytic particles in a sintered polytetrafluoroethylene binder and said electrolyte is a sodium chloride solution.

8. A galvanic cell as claimed in claim 7 for in vivo implantation wherein said envelope consists of a thin silicone rubber membrane and said electrolyte is a substantially 0.9% by weight sodium chloride solution.

* * * * *